UNITED STATES PATENT OFFICE.

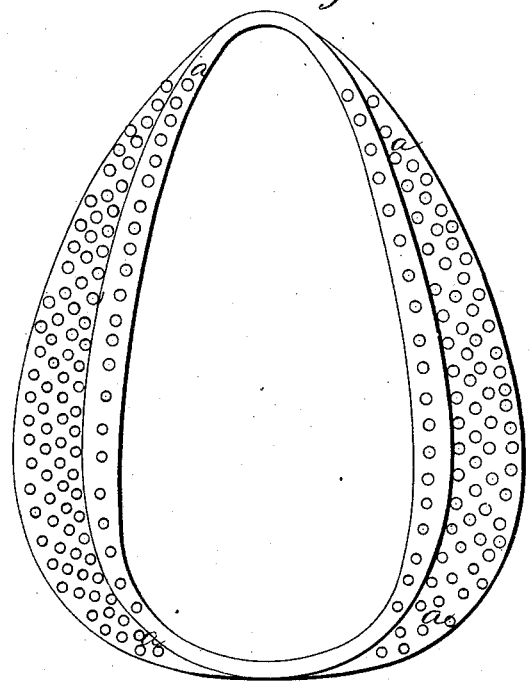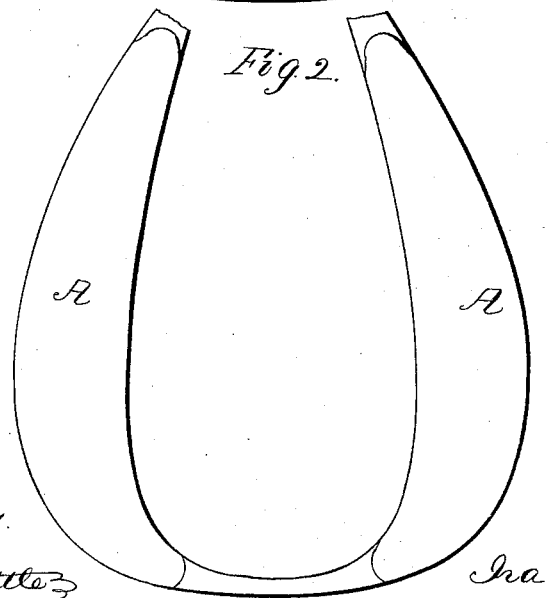

IRA HOUGHTLING, OF HOUGHTON, MICHIGAN.

IMPROVED HORSE-COLLAR.

Specification forming part of Letters Patent No. 76,456, dated April 7, 1868.

*To all whom it may concern:*

Be it known that I, IRA HOUGHTLING, of Houghton, in the county of Houghton and State of Michigan, have invented a new and useful Improvement in Horse-Collars; and I do hereby declare that the following is a full, clear, and exact description thereof, which will enable others skilled in the art to make and use the same, reference being had to the accompanying drawings, forming part of this specification.

Figure 1 represents my improved horse-collar. Fig. 2 is a sectional view.

Similar letters of reference indicate corresponding parts.

This invention relates to a new and useful improvement in horse-collars; and it consists in forming the collar of india-rubber, wood, or any other suitable material, with holes running through it from back to front in any direction to make it light and elastic.

When made of wood, a leather lining, A, is glued or otherwise secured to the inside of the collar to protect the shoulders and breast of the horse, and holes $a\ a$, of any desired size, are bored through the body of the collar from front to back, as shown clearly in the drawings.

Having thus described my invention, what I claim as new, and desire to secure by Letters Patent, is—

Constructing a horse-collar perforated and lined with leather, as described.

IRA HOUGHTLING.

Witnesses:
T. L. CHADBOURNE,
THOMAS M. BRADY.